US006729388B2

United States Patent
Emrich et al.

(10) Patent No.: US 6,729,388 B2
(45) Date of Patent: May 4, 2004

(54) CHARGE AIR COOLER, ESPECIALLY FOR MOTOR VEHICLES

(75) Inventors: Karsten Emrich, Stuttgart (DE); Daniel Hendrix, Stuttgart (DE); Rainer Richter, Stuttgart (DE); Eberhard Pantow, Stuttgart (DE)

(73) Assignee: Behr GmbH & Co., Stuttgart (DE)

( * ) Notice: Subject to any disclaimer, the term of this patent is extended or adjusted under 35 U.S.C. 154(b) by 0 days.

(21) Appl. No.: 09/770,640

(22) Filed: Jan. 29, 2001

(65) Prior Publication Data

US 2001/0027857 A1 Oct. 11, 2001

Related U.S. Application Data

(60) Provisional application No. 60/245,233, filed on Nov. 3, 2000.

(30) Foreign Application Priority Data

Jan. 28, 2000 (DE) .......................................... 100 03 765

(51) Int. Cl.$^7$ ................................................ F28D 1/02
(52) U.S. Cl. ........................ 165/153; 165/152; 165/153; 165/166; 165/177; 165/179; 165/181; 165/183; 165/185; 165/109.1
(58) Field of Search ................................ 165/80.4, 185, 165/177, 179, 181, 183, 109.1, 148, 153, 152, 166

(56) References Cited

U.S. PATENT DOCUMENTS

| 3,768,149 A | * 10/1973 | Swaney, Jr. ................. 29/527.2 |
| 4,300,629 A | * 11/1981 | Hatada et al. .............. 165/151 |
| 4,428,419 A | * 1/1984 | Dubrovsky et al. ......... 165/151 |
| 4,570,700 A | * 2/1986 | Ohara et al. ............. 165/134.1 |
| 4,787,442 A | * 11/1988 | Esformes .................... 165/151 |
| 4,881,311 A | * 11/1989 | Paulman et al. ........... 29/157.3 |

(List continued on next page.)

FOREIGN PATENT DOCUMENTS

| DE | 19 79 652 | 2/1968 |
| DE | 37 04 215 | 11/1995 |
| DE | 295 09 684 | 12/1995 |
| DE | 195 31 383 | 2/1997 |
| DE | 198 46 347 | 4/2000 |
| GB | 2 090 651 | 4/1982 |
| GB | 2 197 450 A | * 5/1988 ............. F28F/1/42 |

Primary Examiner—Henry Bennett
Assistant Examiner—Nihir Patel
(74) Attorney, Agent, or Firm—Foley & Lardner LLP

(57) ABSTRACT

The invention provides a charge air cooler, especially for motor vehicles, having a finned-tube block. The finned-tube block includes flat tubes through which charge air can flow and at least one fin member attached to the flat tubes. At least one fin member includes rows of webs and web crosspieces, the rows offset relative to each other by a predetermined distance. At least one web and/or one web crosspiece possesses at least one vortex generator.

28 Claims, 6 Drawing Sheets

U.S. PATENT DOCUMENTS

| | | | | |
|---|---|---|---|---|
| 4,958,681 A | * | 9/1990 | Kadle | 165/151 |
| 4,984,626 A | * | 1/1991 | Esformes et al. | 165/151 |
| 5,078,207 A | * | 1/1992 | Asano et al. | 165/166 |
| 5,107,922 A | * | 4/1992 | So | 165/109.1 |
| 5,184,672 A | * | 2/1993 | Aoki | 165/109.1 |
| 5,209,289 A | * | 5/1993 | Haushalter | 165/109.1 |
| 5,307,870 A | * | 5/1994 | Kamiya et al. | 165/173 |
| 5,361,829 A | * | 11/1994 | Kreutzer et al. | 165/152 |
| 5,458,190 A | * | 10/1995 | Sasaki et al. | 165/110 |
| 5,476,140 A | * | 12/1995 | Lu | 165/152 |
| 5,482,112 A | * | 1/1996 | Sasaki et al. | 165/110 |
| 5,560,425 A | * | 10/1996 | Sugawara et al. | 165/148 |
| 5,636,685 A | * | 6/1997 | Gawve et al. | 165/109.1 |
| 5,730,213 A | * | 3/1998 | Kiser et al. | 165/148 |
| 5,732,768 A | * | 3/1998 | Fraulo | 165/151 |
| 5,816,320 A | * | 10/1998 | Arnold et al. | 165/152 |
| 5,826,646 A | * | 10/1998 | Bae et al. | 165/110 |
| 5,865,243 A | * | 2/1999 | Kato et al. | 165/153 |
| 5,944,094 A | * | 8/1999 | Kinney, Jr. et al. | 165/166 |
| 6,070,616 A | | 6/2000 | Beck et al. | 138/38 |
| 6,178,292 B1 | * | 1/2001 | Fukuoka et al. | 392/485 |
| 6,189,607 B1 | * | 2/2001 | Hosoya et al. | 165/174 |
| 6,193,140 B1 | * | 2/2001 | Suzuki et al. | 228/183 |
| 6,273,183 B1 | * | 8/2001 | So et al. | 165/109.1 |
| 6,332,495 B1 | * | 12/2001 | Jamison et al. | 165/153 |
| 6,453,989 B1 | * | 9/2002 | Watanabe et al. | 165/177 |

* cited by examiner

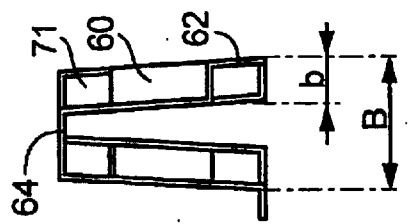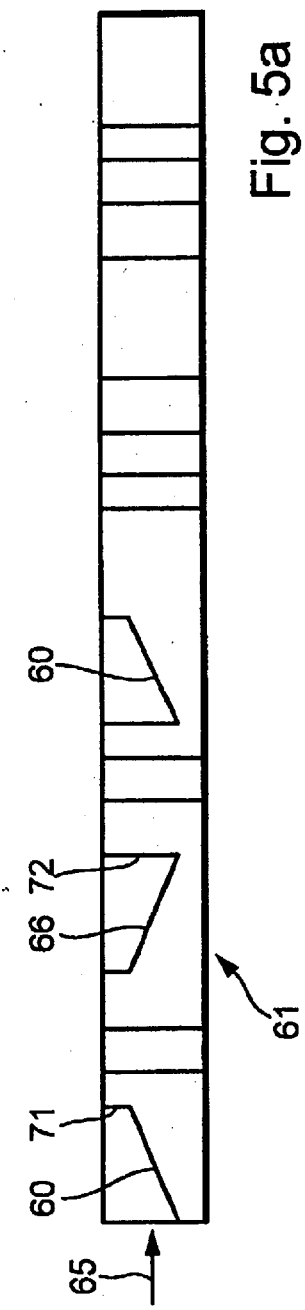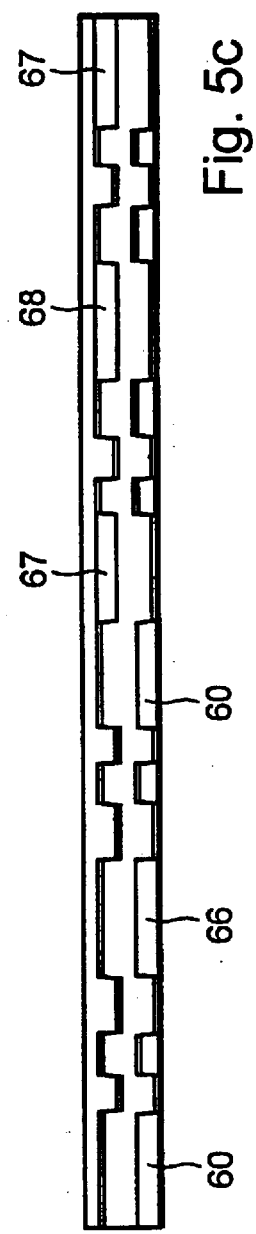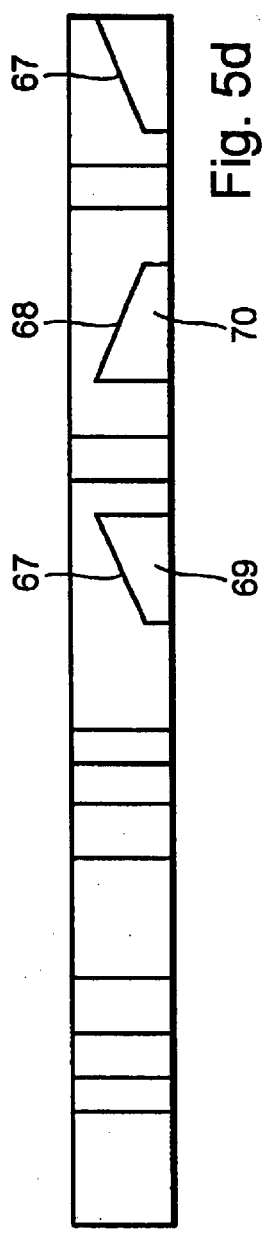

CHARGE AIR COOLER, ESPECIALLY FOR MOTOR VEHICLES

This application claims the benefit of U.S. Provisional Application No. 60/245,233, filed Nov. 3, 2000.

BACKGROUND OF THE INVENTION

1. Field of the Invention

The invention relates generally to charge air coolers and particularly to a charge air cooler for motor vehicles.

2. Description of the Related Art

A typical prior art air cooler is described in the *Shell Lexikon Verbrennungsmotoren* (*Shell Dictionary of Internal Combustion Engines*), supplement to *ATZ* (*Automotive Engineering Journal*) and *MTZ* (*Engine Engineering Journal*), series 33. It consists of a finned-tube block, which is connected to a charge air inlet chamber and to a charge air outlet chamber. In this arrangement, hot charge air can flow from an internal combustion engine of the motor vehicle through flat tubes of the finned-tube block. A large proportion of the heat is transferred to the ambient air via fins arranged between the flat tubes and subjected to the action of ambient air. Within the flat tubes, there is an internal fin member which possesses rows of webs and web crosspieces. The rows are curved in the manner of webbed fins and offset relative to one another by predetermined distances. This ensures mixing of the charge air within the flat tubes.

A disadvantage of such a charge air cooler is that, within a particular row between two webs, a hot core flow remains behind in the region of the core of the flow, from which virtually no heat transfer to the internal fin member takes place. This occurs even though the charge air undergoes good heat transfer to the internal fin member in the boundary layer region. Overall, then, the actual heat transfer performance is less than the theoretically possible heat transfer performance.

Another related reference is DE 196 54 367 A1 and its corresponding publication U.S. Pat. No. 6,070,616, which discloses a method for attaching vortex generators in the form of winglets to a thin metal sheet. The vortex generators are shaped from the thin metal sheet by massive forming.

SUMMARY OF THE INVENTION

An object of the invention is to improve a charge air cooler of the type discussed above, in such a way that the heat exchange is improved over the entire flow profile and the hot core flow is passed to the internal fin member.

According to the first embodiment of the invention, at least one web and/or one web crosspiece of the internal fin member introduced into the flat tubes possesses at least one vortex generator. As a result, improved mixing of the hot core flow with the boundary layer flow is achieved. This is accomplished by a transverse flow in which the heat of the core flow is no longer guided by the internal fin member and the boundary layer flow guided in isolation by the wall of the flat tube. That is, the boundary layer flow is deliberately broken up and mixed. In addition to the simple breaking-up of the boundary layer flow, lengthwise vortexes are formed by the vortex generators, especially by the winglets. This causes the mixing action to extend far into the core flow. This enables the heat of all the charge air to be removed more efficiently to the ambient air.

In an another embodiment of the invention, the vortex generators are designed in the form of winglets, as a ramp or in the form of a tab. In these arrangements, the longitudinal axis of the winglets extends obliquely relative to the main flow direction of the charge air, in particular at an angle of approximately 15° to 45°. As a result of such an arrangement of the winglets and the adjustment of the angle of the oblique position, control can be selectively exerted on the shape of the lengthwise vortex and hence, on the mixing of the flow.

In a further embodiment of the invention, consecutive webs in the main flow direction of the charge air have oppositely oriented winglets. As a result, after a lengthwise vortex with a particular direction of rotation is generated by a first winglet, a lengthwise vortex in the opposite direction is generated at the next winglet.

This further increases the efficiency of mixing.

In another embodiment of the invention, the winglets are arranged in pairs and extend in opposite directions obliquely to the main flow direction of the charge air, extending away from one another in the main flow direction of the charge air. The winglets are produced by shaping the webs and/or web crosspieces.

In a further embodiment of the invention, every second web of a row has a winglet oriented in the same direction. This is particularly beneficial in regards to manufacturing. It allows one row at a time to be demolded in parallel and hence, guarantees the simplest and most cost-effective design possible for the internal fin members.

In another embodiment of the invention, the vortex generator is designed in the form of a ramp inclined obliquely relative to the main flow direction of the charge air. In particular, the incline is at an angle of approximately 20° to 30°. The air flow is deflected upward and downward by the ramp. In addition, a vortex flow with a significant transverse component is generated. This transverse component prevents the formation of a continuous core flow.

In a further embodiment of the invention, ramps ascending in the main flow direction of the charge air are followed by ramps descending in the main flow direction of the charge air. As a result, the air flow, as it passes through the fin member, is alternately deflected upward with one component and downward with the next component. This results in further turbulence and reduction of a continuous core flow.

Examples of embodiments of the invention are shown in the drawings and are described in detail below.

BRIEF DESCRIPTION OF THE DRAWINGS

FIG. 5*a* shows a lateral view of an internal fin member according to FIG. 5;

FIG. 5*b* shows a front view of an internal fin member according to FIG. 5*a;*

FIG. 5*c* shows a plan view of an internal fin member according to FIG. 5*a;*

FIG. 5*d* shows a lateral view of the back of an internal fin member according to FIG. 5*a;*

DETAILED DESCRIPTION OF THE PREFERRED EMBODIMENTS

Figure 1:
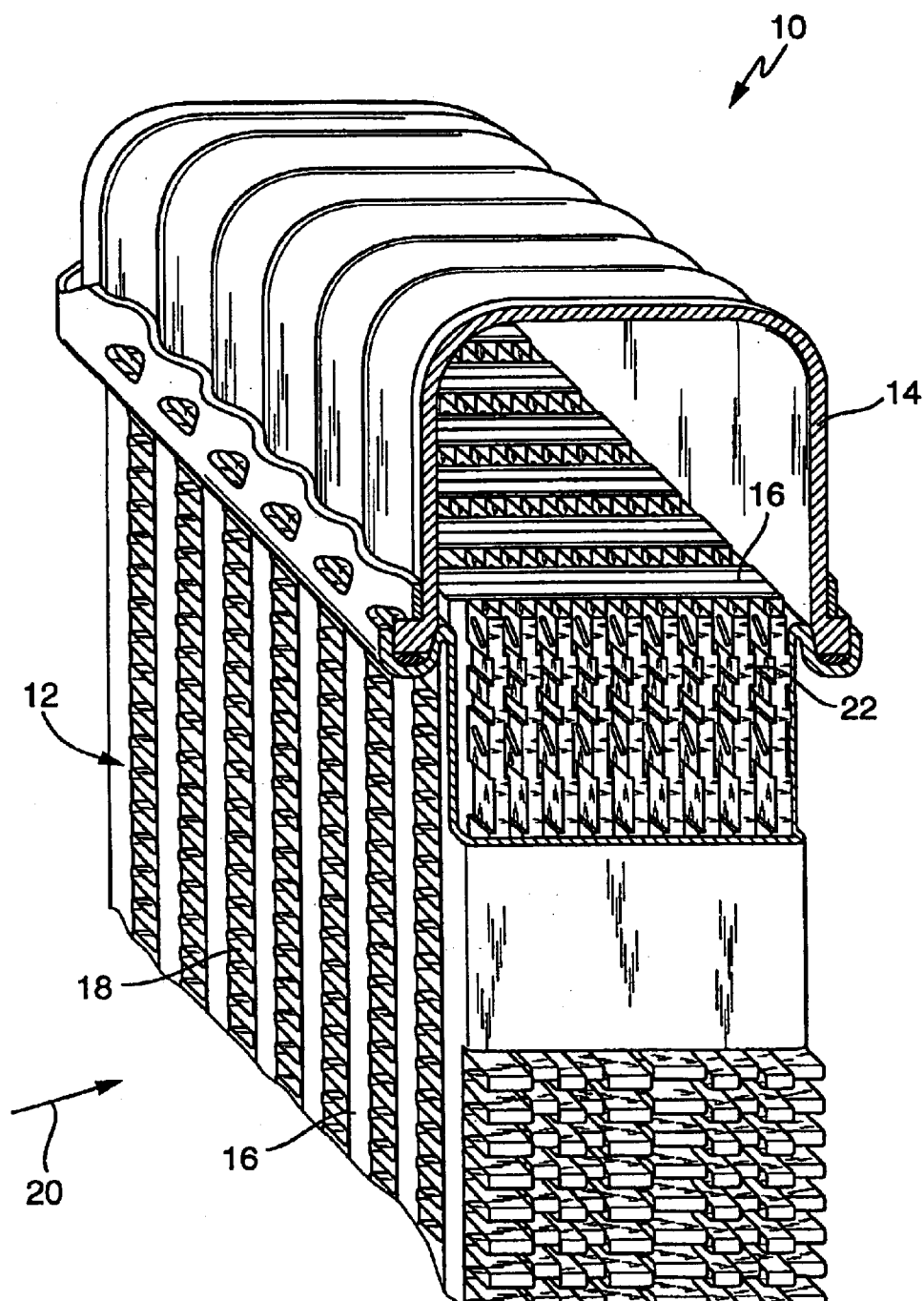
FIG. 1 shows a perspective, sectional view of a charge air cooler.

FIG. 1 shows a perspective, sectional view of a charge air cooler 10. This charge air cooler 10 comprises a finned-tube block 12, which is connected to a charge air inlet chamber 14 and to a charge air outlet chamber (not shown). The finned-tube block 12 comprises flat tubes 16, between which fins 18 are arranged in the form of webbed fins or corrugated fins. The fins 18 are soldered to the flat tubes 16. Charge air from an internal combustion engine (not shown) of a motor vehicle flows from the charge air inlet chamber 14 through the flat tubes 16 to the charge air outlet chamber. Perpendicular to this charge air flow, the fins 18 are subjected to the action of ambient air 20. Because the charge air has a significantly higher temperature than the ambient air 20, heat transfer takes place from the charge air to the ambient air 20.

Figure 2:
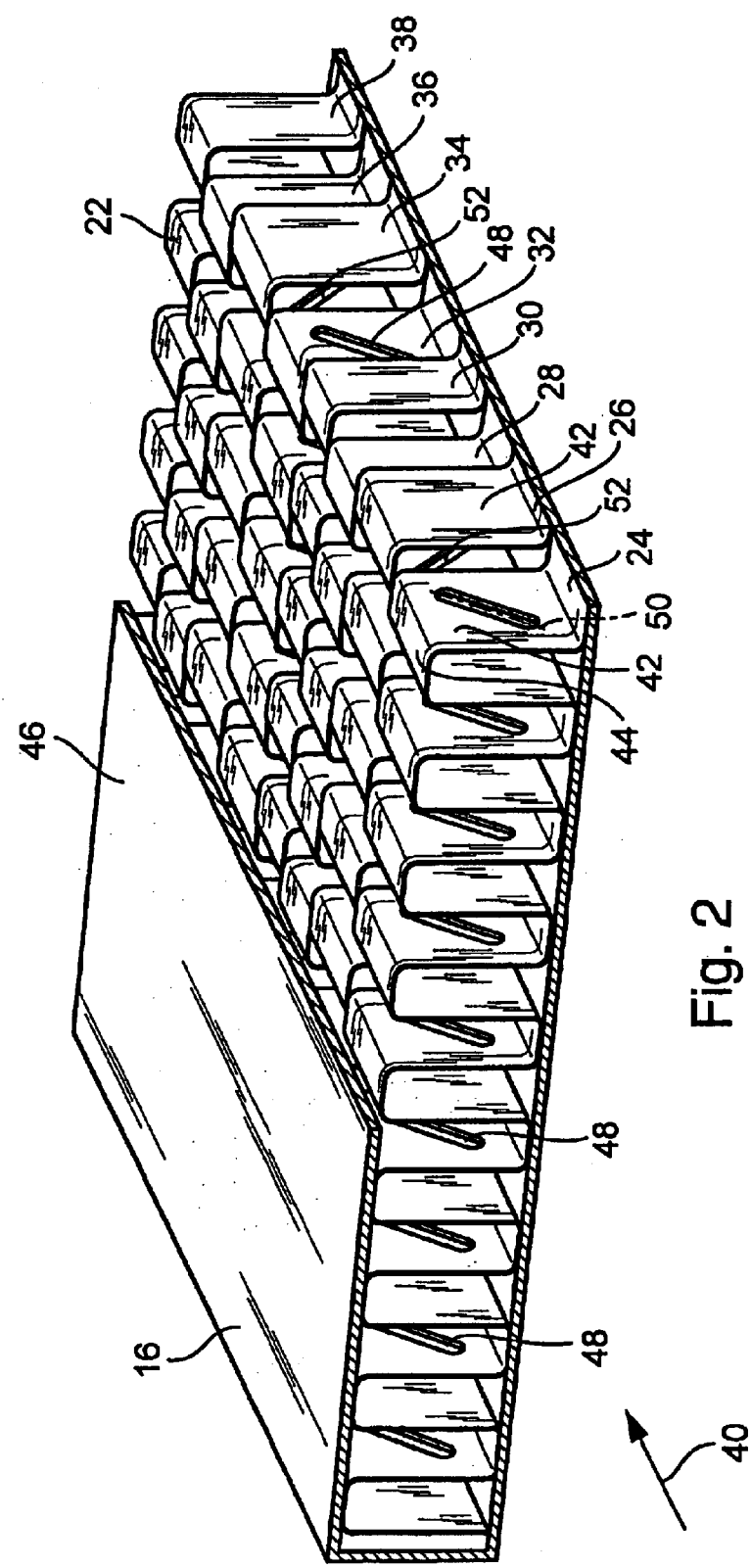
FIG. 2 shows a perspective, partial sectional view of a flat tube with internal fin members introduced therein.

Internal fin members 22 are arranged within the flat tubes 16 and soldered thereto. As is shown in FIG. 2, these are curved in the manner of webbed fins and comprise a plurality of rows 24 to 38. They are each arranged perpendicularly to the main flow direction 40 of the charge air and are arranged offset relative to one another. The individual rows 24 to 38 each comprise webs 42 and web crosspieces 44. The web crosspieces 44 extend substantially parallel to the wide sides 46 of the flat tubes and the webs 42 substantially perpendicularly to the latter.

When charge air flows through the flat tubes 16, a core flow forms within each row 24 to 38 of the internal fin members 22 and is surrounded by a boundary layer flow existing in the region of the walls. Because of the insulation provided by the boundary layer flow, the core flow has a significantly higher temperature level in comparison with the walls.

For improved mixing of the core flow with the boundary layer flow, the webs 42 have vortex generators 48 with a beading-like design arranged approximately centrally on their surfaces. The longitudinal axis 50 of the vortex generators 48 are inclined at approximately 45° relative to the main flow direction of the charge air. Every second web 42 of the first rows 24 and 32 possesses vortex generators 48. The vortex generators 48 are formed from the material by shaping at the same angle of inclination and in the same direction. The rows 26 and 34, likewise possess a vortex generator 52 at every second web 42. These are shaped from the material in the opposite direction of the vortex generators 48 and are also set obliquely at an angle approximately 45° in the opposite direction.

Figure 3:
FIG. 3 shows a sectional representation of a vortex generator, perpendicular to its longitudinal axis.
Figure 4:
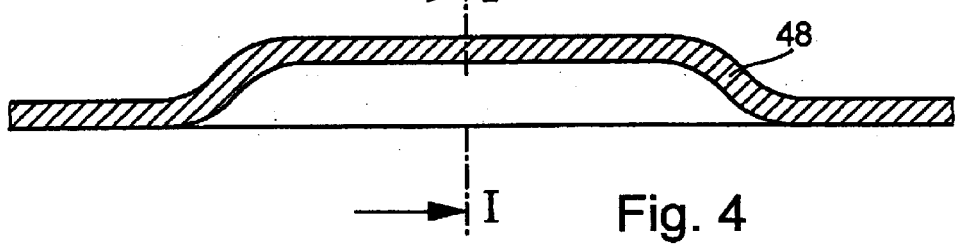
FIG. 4 shows a sectional representation of a vortex generator along its longitudinal axis.

FIG. 3 shows a sectional view through a vortex generator 48 perpendicular to its longitudinal axis 50 while FIG. 4 shows a view along its longitudinal axis. From these figures, it can be seen that the vortex generators are produced, simply by shaping the material and that they possess a continuous surface. Thus, a flow from one side of the material through the region of the vortex generators to the other side of the material is excluded.

By means of the vortex generators 48, 52, an improved mixing of the hot core flow with the boundary layer flow is achieved. Thus, the heat of the core flow is no longer guided by the internal fin member and the boundary layer flow in isolation by the wall. That is, the boundary layer flow is deliberately broken up and mixed. This results in an increase in the heat transfer performance of the charge air cooler 10.

Figure 5:
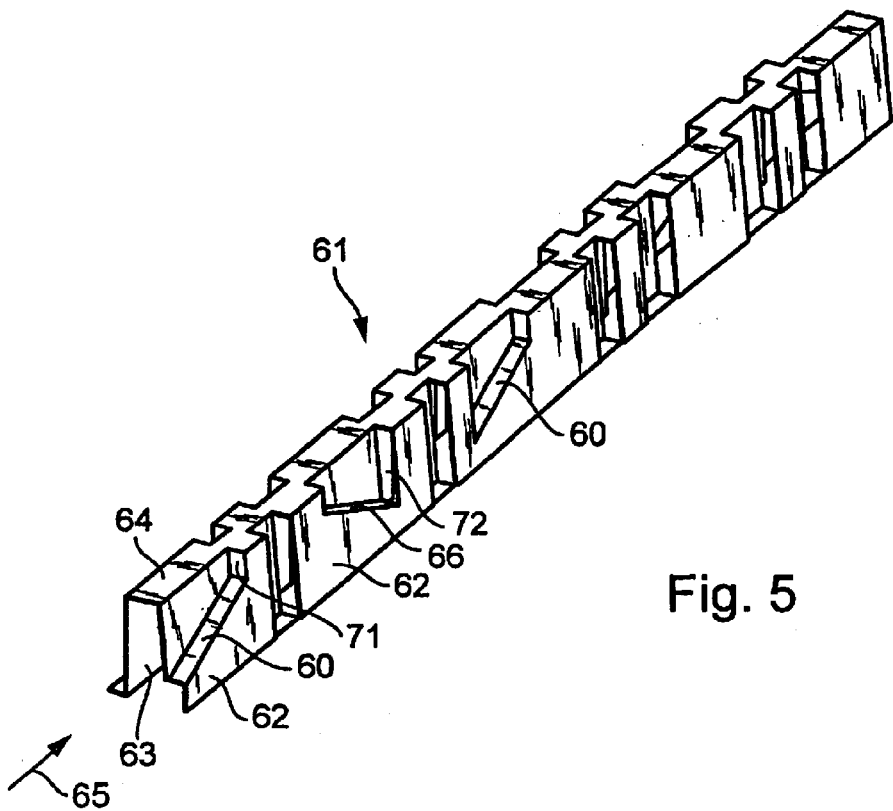
FIG. 5 shows a perspective view of an internal fin member with vortex generators designed as ramps.

FIG. 5 shows a further advantageous embodiment of the internal fin. In the webbed fin 22 shown previously, the vortex generators 48, 52 are designed as elongate beadings which are stamped from the surface of a web 42. In the example of an embodiment according to FIG. 5, this vortex generator is designed as a ramp 60, as can be seen in a perspective view of a fin member 61 in FIG. 5. The fin member 61 comprises webs 62 and 63, which are connected to one another via a web crosspiece 64. The ramps 60 are designed as flat surfaces extending obliquely to the air flow direction 65, and form approximately a right angle. In other words, they form a type of shoulder with the web surfaces 62. The ramps 60 in FIG. 5 ascend, when viewed in the air flow direction 65. In contrast, ramps 66 are also provided which descend, when viewed in the air flow direction.

A more detailed representation of the fin member 61 is given in FIGS. 5a, 5b, 5c and 5d. FIG. 5a shows a lateral view of the front of the fin member 61, in other words, transverse to the air flow direction 65. It can be seen that, when viewed in the air flow direction 65, the sequence comprises first an ascending ramp 60, then a descending ramp 66 and then another ascending ramp 60. These ramps 60, 66 and 60 can also be seen in FIG. 5c, a view of the fin member 61 from above. In FIG. 5d, the fin member 61 is shown in a lateral view from the rear. In this case, further ramps 67 and 68 are arranged in the right-hand region of the fin member 61, in other words, in the downstream part of the fin. An ascending ramp 67 is followed by a descending ramp 68 and this in turn is followed by another ascending ramp 67. It is particularly apparent from FIG. 5c that fin member 61 possesses a total of six ramps, three ramps 60, 66, 60 being arranged in the front region and a further three ramps 67, 68, 67 in the rear region on the opposite side of the fin.

FIG. 5b shows the fin member 61 in a view from the front, in other words, viewed in the air flow direction 65. The ramp 60, which is an ascending surface relative to the air flow, has a width of b=1.3 mm. This corresponds approximately to one-third of the total width B of this fin member. At the upper end of the ramp 60, is a passage 71 with an approximately rectangular cross section, through which the air flow can pass. Apertures similar to aperture 71 are arranged at the end of each of the ascending ramps 60 and 67 or at the beginning of the descending ramps 66 and 68. In addition, passage apertures 72 are likewise provided downstream of the descending ramps 66 and 68, and are shown in FIG. 5 and FIG. 5a.

The effect of these ramps 60, 66, 67, 68 is first, the air flow 65 is deflected upward and downward and second, a turbulent flow with a significant transverse component is generated. This transverse component is generated, in particular, by the shape and dimensions (width b) of the ramp and prevents the above mentioned continuous core flow.

Figure 6:
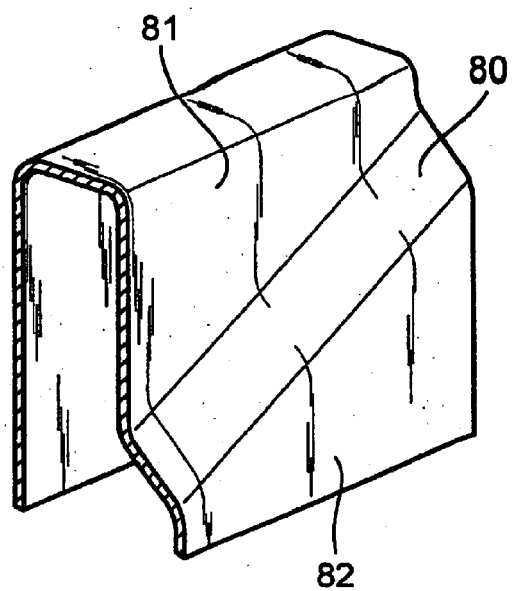
FIG. 6 shows a detail view of a ramp according to FIG. 5.
Figure 7:
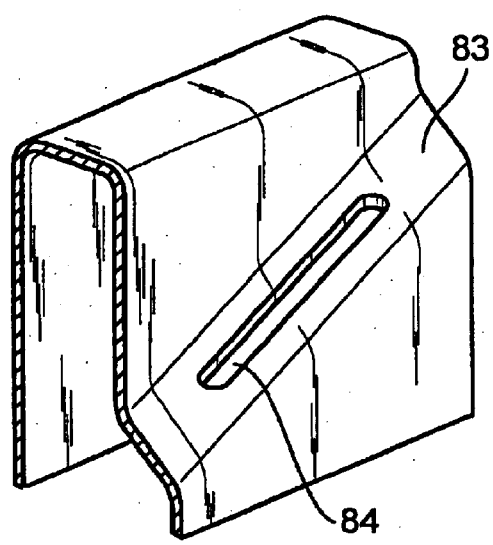
FIG. 7 shows a detail view of a ramp according to FIG. 5 provided with a passage aperture.

Further embodiments of the invention, which show a vortex generator in ramp form, are illustrated in FIGS. 6 to 10. FIG. 6 shows a section of the above-mentioned fin member with a ramp 80 that forms an obtuse angle relative to the web surfaces 81 and 82. In the example of embodiment according to FIG. 5, this angle was a right angle. FIG. 7 shows a modification of FIG. 6. In this embodiment, a similar ramp 83 is provided whose surface is pierced by a passage aperture 84 for the air flow.

Figure 8:
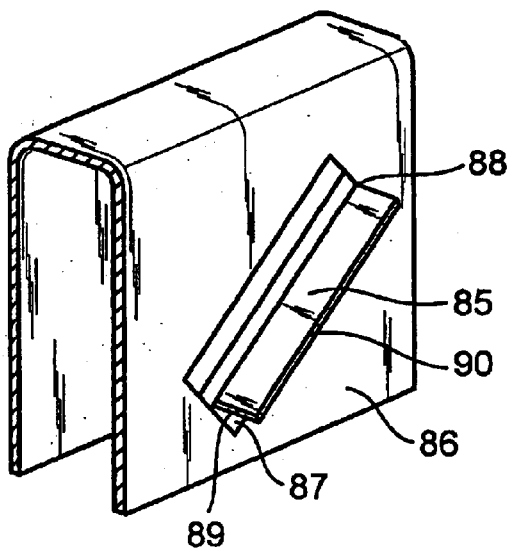
FIG. 8 shows a detail view of a vortex generator formed by a tab.

FIG. 8 shows a modification, in which the ramp-shaped vortex generator is designed as an exposed tab 85. Tab 85 is partially punched out from the web surface 86 and is exposed at a right angle or obtuse angle to the web surface 86. As a result of this tab 85, first, a passage aperture 87 is formed in the web wall 86, and second, cut-off edges 88 and 89, and also 90, are formed. These provide further turbulence of the air flow.

Figure 9:
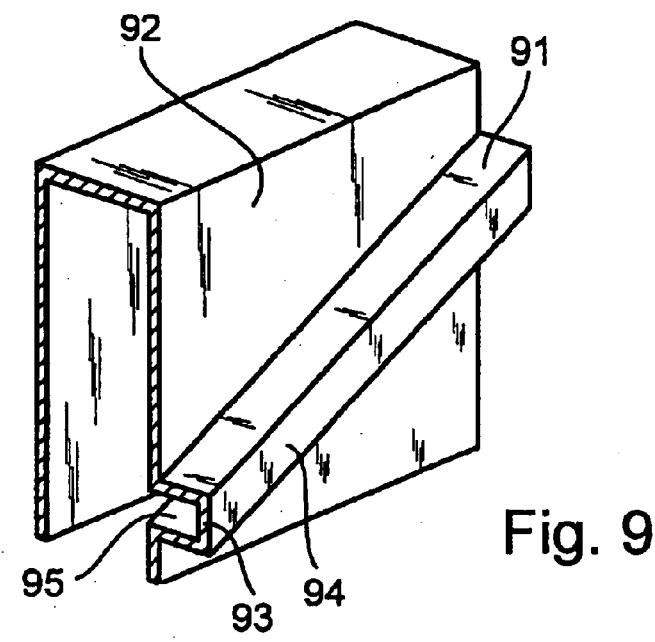
FIG. 9 shows a detail view of a vortex generator formed by a box-shaped ramp.

FIG. 9 shows a box-shaped ramp 91, which is punched out from the web surface 92 as a U-shaped section 93. This U-shaped section thus comprises the surfaces 91, 94 and 95, arranged approximately at right angles to one another.

Figure 10:
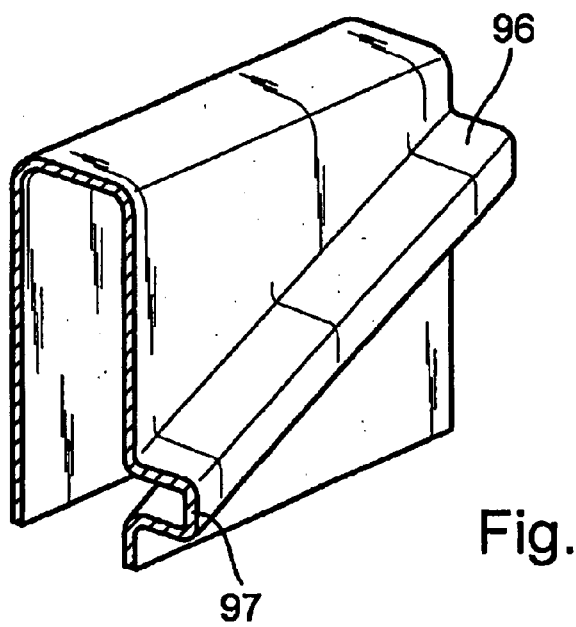
FIG. 10 shows a detail view of a vortex generator formed by a rounded hollow section.

FIG. 10 shows a further alternative embodiment having a ramp 96 with a rounded hollow section 97. The ramps 91 and 96 thus differ only slightly in respect to their hollow sections, but this does have an effect on the vortex formation.

All the above-mentioned ramps according to FIGS. 6 to 10 have the common feature that they are all inclined approximately at an angle of 20°–30° relative to the air flow direction.

The foregoing description of the invention has been presented for purposes of illustration and description. It is not intended to be exhaustive or to limit the invention to the precise form disclosed, and modifications and variations are possible in light of the above teachings or may be acquired from practice of the invention. The drawings and description were chosen in order to explain the principles of the invention and its practical application. It is intended that the scope of the invention be defined by the claims appended hereto, and their equivalents.

German priority application no. 100 03 765.8 filed Jan. 28, 2000, including the specification, drawings, claims and abstract, is hereby incorporated by reference.

We claim:

1. A charge air cooler, having a finned-tube block, the finned-tube block comprising:
   flat tubes through which charge air can flow;
   at least one fin member attached to the flat tubes;
   wherein the at least one fin member includes rows of webs and web crosspieces, the rows offset relative to each other by a predetermined distance;
   wherein at least one web and/or one web crosspiece comprises at least one vortex generator;
   wherein the at least one vortex generator is inclined at a positive angle relative to a main air flow direction; and
   wherein the positive angle is measured within a plane parallel to a plane formed by the at least one web and/or one web crosspiece which comprises the at least one vortex generator.

2. The charge air cooler as claimed in claim 1, wherein the at least one vortex generator comprises a winglet.

3. The charge air cooler as claimed in claim 1, wherein the at least one vortex generator comprises a ramp.

4. The charge air cooler as claimed in claim 1, wherein the at least one vortex generator comprises a tab.

5. The charge air cooler as claimed claim 2, wherein the longitudinal axis of the winglets is inclined at an angle of approximately 15° to 45° relative to the main flow direction of the charge air.

6. The charge air cooler as claimed claim 2, wherein consecutive webs in the main flow direction of the charge air have oppositely oriented winglets.

7. The charge air cooler as claimed claim 6, wherein the winglets are arranged in pairs and extend in opposite directions obliquely to the main flow direction of the charge air, extending away from one another in the main flow direction of the charge air.

8. The charge air cooler as claimed in claim 2 wherein the winglets, are produced by shaping the webs and/or web crosspieces.

9. The charge air cooler as claimed in claim 2, wherein every second web of a row has a winglet oriented in the same direction.

10. The charge air cooler as claimed in claim 3, wherein the ramp is inclined obliquely relative to the main flow direction of the charge air.

11. The charge air cooler as claimed in claim 10, wherein the inclination is at an angle of approximately 20° to 30°.

12. The charge air cooler as claimed in claim 10, wherein ramps ascending in the main flow direction of the charge air are followed by ramps descending in the main flow direction of the charge air.

13. The charge air cooler as claimed in claim 12, wherein the fin member has a first side and a second side and the ramps are arranged alternatingly in succession in the main flow direction of the charge air on the first side of the internal fin member and on the second side of the internal fin member.

14. The charge air cooler as claimed in claim 10, wherein the ramp possesses a passage aperture.

15. The charge air cooler as claimed in claim 10, wherein the ramp has a width b of approximately 1.3 mm.

16. The charge air cooler as claimed in claim 4, wherein the tab is partially punched out from the web surface and is positioned at an angle with respect to the web surface.

17. The charge air cooler as claimed in claim 16, wherein the angle is a right angle to the web surface.

18. A charge air cooler for a motor vehicle, comprising a charge air cooler having a finned-tube block, the finned-tube block comprising:
   flat tubes through which charge air can flow;
   at least one fin member attached to the flat tubes;
   wherein the at least one fin member includes rows of webs and web crosspieces, the rows offset relative to each other by a predetermined distance;
   wherein at least one web and/or one web crosspiece comprises at least one vortex generator;
   wherein the at least one vortex generator is inclined at a positive angle relative to a main air flow direction; and
   wherein the positive angle is measured within a plane parallel to a plane formed by the at least one web and/or one web crosspiece which comprises the at least one vortex generator.

19. A fin member for flat tubes of a charge air cooler, formed as a webbed fin with lateral webs, which are connected by a web crosspiece, comprising:
   ramps formed from the lateral web surfaces and arranged at an inclination in the air flow direction at an angle of 20° to 30° and with a width of $0.5 \leq b \leq 2.1$ mm.

20. An air charge cooler according to claim 1, wherein the positive angle is 45°.

21. An air charge cooler according to claim 1, wherein the positive angle is 15–45°.

22. An air charge cooler according to claim 1, wherein the at least one vortex generator is arranged approximately centrally on the surface of the at least one web.

23. An air charge cooler according to claim 1, wherein the air charge cooler comprises at least four webs and at least two vortex generators and wherein every second web comprises a vortex generator arranged at a first angle.

24. An air charge cooler according to claim 22, further comprising at least two additional vortex generators each arranged on a web other than every second web and each arranged at an angle 90° opposed to the first angle.

25. An air charge cooler according to claim 1, wherein the at least one vortex generator comprises a continuous surface.

26. An air charge cooler according to claim 1, wherein the at least one vortex generator is formed from the same piece of material as the at least one web.

27. An air charge cooler according to claim 1, wherein the angle is sufficient to break up a boundary layer of air during air flow and mix the boundary layer with a core layer.

28. A charge air cooler, having a finned-tube block, the finned-tube block comprising:
- flat tubes through which charge air can flow;
- at least one fin member attached to the flat tubes;
- wherein the at least one fin member includes rows of webs and web crosspieces, the rows offset relative to each other by a predetermined distance;
- wherein at least one web and/or one web crosspiece comprises at least one vortex generator;
- wherein the at least one vortex generator is inclined at a positive angle relative to a main air flow direction; and
- wherein the vortex generator comprises a length, width and height and wherein the length of the vortex generator is greater than both the width and the height.

* * * * *